United States Patent [19]

Messerschmitt

[11] Patent Number: 4,539,734
[45] Date of Patent: Sep. 10, 1985

[54] TENSIONING DEVICE FOR THE SCREEN FABRIC IN SILK SCREEN PRINTING FRAMES

[76] Inventor: Elmar Messerschmitt, Paul-Hösch-Str. 13, 8000 München, Fed. Rep. of Germany

[21] Appl. No.: 543,261

[22] Filed: Oct. 19, 1983

[30] Foreign Application Priority Data

Oct. 23, 1982 [DE] Fed. Rep. of Germany ....... 3239319

[51] Int. Cl.³ .................... D06C 3/08; A47H 13/00
[52] U.S. Cl. ........................ 24/460; 24/461; 24/462; 160/383; 160/392; 38/102.91
[58] Field of Search ............ 24/460, 461, 462; 160/383, 384, 391, 392, 395, 400; 38/102.91

[56] References Cited

U.S. PATENT DOCUMENTS

| 2,210,652 | 8/1940 | Dennett | 160/392 |
| 3,060,985 | 10/1962 | Vance et al. | 24/462 |
| 3,186,712 | 6/1965 | Kessler | 160/392 |
| 3,273,497 | 9/1966 | Rosema et al. | |
| 3,384,938 | 5/1968 | O'Connor | 24/461 |
| 3,757,479 | 9/1973 | Martinez | 160/392 |
| 3,803,671 | 4/1974 | Stuppy et al. | 24/460 |
| 3,805,873 | 4/1974 | Bloomfield | 24/462 |
| 3,908,293 | 9/1975 | Newman | |
| 3,913,655 | 10/1975 | Ogino | 160/383 |
| 3,982,306 | 9/1976 | Curry | 24/462 |
| 4,107,826 | 8/1978 | Tysdal | 24/460 |

FOREIGN PATENT DOCUMENTS 2806710 8/1978 Fed. Rep. of Germany ...... 160/392

Primary Examiner—Victor N. Sakran
Attorney, Agent, or Firm—Lilling & Greenspan

[57] ABSTRACT

A silk screen printing frame includes a tensioning device for tensioning the silk screen printing fabric in such a way that in the side walls of the frame a groove of C-shaped cross-section is arranged. To tension the screen fabric, the fabric is looped around a clamping strip, which is inserted into the groove opening. The clamping strip is elastically deformable and occupies an increased width under tension, so that after the clamping strip has snapped into the groove, the screen fabric is taut. The clamping strip is arcuate and consists of an elastically bendable spring material of plastic or metal.

9 Claims, 9 Drawing Figures

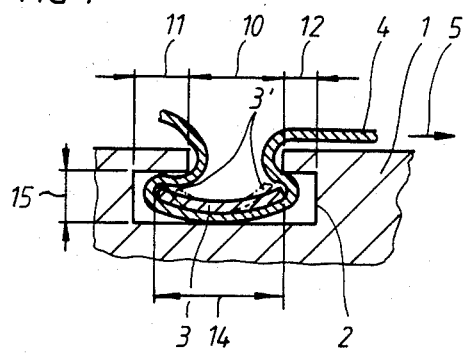
FIG 1
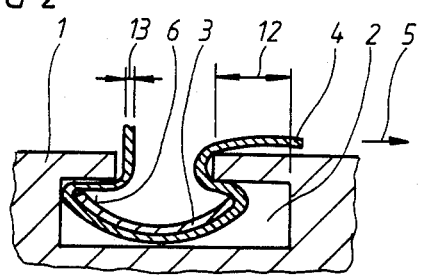
FIG 2
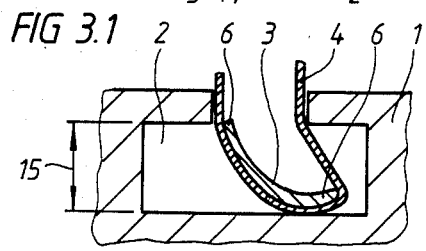
FIG 3.1
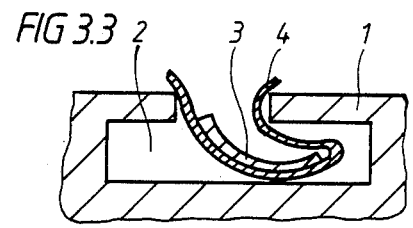
FIG 3.3
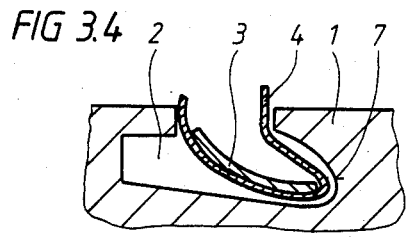
FIG 3.4
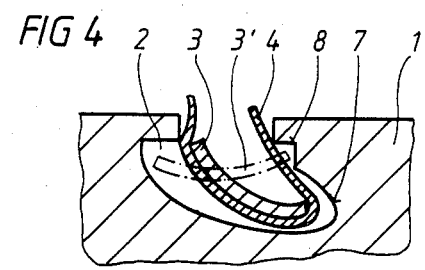
FIG 4
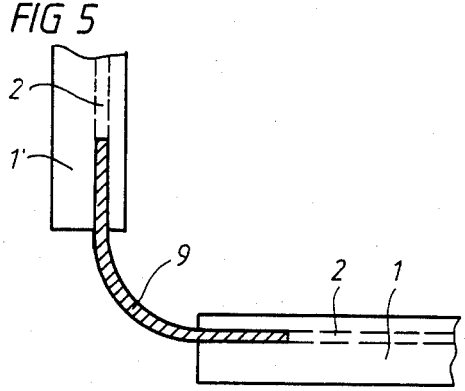
FIG 5
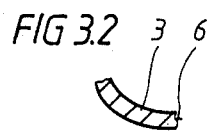
FIG 3.2
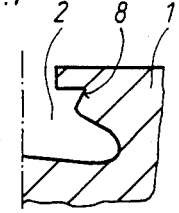
FIG 4.1

TENSIONING DEVICE FOR THE SCREEN FABRIC IN SILK SCREEN PRINTING FRAMES

BACKGROUND OF THE INVENTION

The invention relates to a tensioning device for the screen fabric in silk screen printing frames. Various tensioning or clamping devices are known by which the screen fabric is fastened in the screen printing frame.

In a first known group of clamping devices, the silk screen printing fabric to be clamped (called "material" for short) is inserted into the C-shaped groove of a tension bar which is formed as the edge limitation of the screen printing frame, the material being fastened by a rod section or band of metal or plastic. The rod section is pushed laterally into the cross-section of the C-shaped groove (called "groove" for short) and this in such a way that the material clamps in the groove under the action of tensile force. In U.S. Pat. No. 3,962,805 a specifically conical rod section with a nose structure is shown, which is placed into the C-shaped groove together with the silk screen printing fabric to be clamped.

In U.S. Pat. No. 3,144,258 the insertion of a flat band is known, while in U.S. Pat. No. 3,962,805 a round rod is used. In U.S. Pat. No. 3,601,912 a flat section is described, which can be bent axially for adaptation to an open L-shaped groove.

Another group of known prior publications designs the clamping section so that section rods are placed into the groove from above in their entire length. In German Pat. No. 1,761,148 and in U.S. Pat. No. 3,482,343 a flat rod locks in a G-shaped groove. In U.S. Pat. No. 3,553,862, two round rods interlock in a specially formed groove.

In U.S. Pat. No. 3,608,482, an approximately semicircular rod locks by rotation in the manner of an eccentric.

All described arrangements have various disadvantages. With the use of a rod section according to U.S. Pat. Nos. 3,962,805 and 3,144,258 the disadvantage is that tolerances in the dimensions of the groove opening and in the rod section have the effect that with respect to the length of the rod section the clamping differs in firmness. A similar effect results when the fabric does not have the same thickness in the clamping region at various points.

The features relating to the configuration of the rod and groove form placed under protection according to the previously described U.S. patents are intended to minimize this disadvantage. In the case of strip sections the disadvantage resides especially in the fact that the force exerted by the tensioned material has a deforming effect on the strip material and forces the latter out of the groove when a certain traction is exceeded, or at least abolishes the clamping. Until now strip material is inserted only from the cross-section (that is, from the end face of the groove), resulting in difficulties when the space in the groove is constricted too much by the material or respectively the friction becomes too great. In the case of the mentioned clamping devices, the thickness range for the materials to be clamped is very narrowly limited, i.e. for different thickness ranges clamping devices of different dimension are needed. With rotatable rod sections (U.S. Pat. No. 3,908,293) the mentioned difficulties are essentially reduced. But they clamp so tightly that they are difficult to release, and this leads to deformations.

SUMMARY OF THE INVENTION

Pasting caused by ink leads to difficulties in nearly all of the mentioned devices.

It is, therefore, an object of the present invention to develop a clamping device for the screen fabric in silk screen printing frames in such a way that a uniform clamping force is obtained along the entire length to be clamped.

It is a further object of the present invention to design the clamping device so that the clamping of the fabric is done very quickly and simply.

It is a third object of the invention to design a clamping device so that the clamping can be abolished very easily, and that pasting and introduction of dirt will not lead to impairment of the function of the clamping device.

For the solution of the problem posed, the invention is characterized in that there is arranged at the screen printing frame a C-shaped groove into which a clamping body formed concave toward the groove opening is introduced from above through the groove opening and becomes clamped together with the screen material in the region of the C-shaped groove as this material is being tensioned.

An advantage here is that the concavely formed clamping body (called also clamping strip) can be introduced into the groove from above on its entire length. Owing to this, the clamping operation occurs very quickly, for it is not necessary to insert the clamping strip from the end face of the groove. What is important is that the clamping body or clamping strip consists of a concavely formed, resilient band material, e.g. steel and/or plastic, and is anchored in the groove together with the screen fabric to be clamped, and that the screen fabric abuts behind the convex arch of the clamping strip and, together with the clamping strip, is anchored in the region of undercuts of the C-shaped groove in this groove.

When the traction of the fabric acts on the bridge type arch of the resilient band, the arch is flattened somewhat and pulled widthwise, so that the edges adapt themselves closely to all thickness differences due to the oblique force action (angle). If the C-groove is made unsymmetrical, so that the undercut is greater in the pulling direction (that is, on the inward side of the frame) of the material to be clamped than in the opposite direction (that is, on the outward side of the frame), the arched band material can be snapped into the C-groove lengthwise (from above) with application of little force. Since the undercut is narrower on the outward side of the frame, the band material makes contact there under tension but cannot leave the groove on the tension side if the width of the clamping strip is greater than the width of the groove opening plus the width of the undercut counter to the pulling side (that is, the outward side of the frame).

Even if the width of the undercut on the pulling side (inward side) is not greater than the width of the undercut on the inward side, but is deep enough for the band to be snapped in obliquely, insertion from above and clamping are possible if this dimensioning rule is observed. The inner width of the groove need not be the same over the entire height of the groove. It is even advisable to reduce it toward the groove opening, so that the band, rising under traction toward the opening, becomes clamped more and more. The more space the groove offers at the base, the easier it is to introduce also great material thicknesses. Since under traction the band is pushed against the groove opening below the undercut, the clamping effect can be further improved by providing a catch in the groove on the pulling side.

The clamping effect can be further improved by making the band itself friction-supporting (friction-increasing), e.g. by ruts or jags along the edges or by a soft coating.

Taking the band out is easily possible with the recommended arrangement, by lateral extraction of the band from the end face of the groove, but also by a pull on the material counter to the pulling side which is greater than the tension in tensioning direction, which is easy to do by hand e.g. with the fabric slackened somewhat. What is essential in the invention is that the screen fabric is tensioned by elastic deformation of the clamping strip. After the clamping strip has been introduced into the groove together with the screen fabric to be tensioned, the clamping strip tightens. This causes the arched cross-section to become flatter and the width of the clamping strip to increase under traction, so that the screen fabric is tensioned.

BRIEF DESCRIPTION OF THE DRAWINGS

The invention will now be described with reference to several embodiments.

FIG. 1 shows a section through a groove in a screen printing frame, with the inserted clamping strip in the tensioned (broken line) and untensioned state;

FIG. 2 is a section of a further embodiment of a differently shaped groove in clamping position;

FIG. 3.1 is a sectional view, showing introduction of the clamping strip with the screen fabric to be tensioned into the groove;

FIG. 3.2 is a partial section through the clamping strip with representation of a toothed, lateral edge;

FIG. 3.3 is a sectional view, showing introduction of a clamping strip with screen material to be tensioned into another groove of a different form;

FIG. 3.4 is a sectional view showing introduction of a clamping strip with screen material to be tensioned into another groove of a different form;

FIG. 4 is a sectional view, showing introduction of a clamping strip with screen material into a groove of a different form;

FIG. 4.1 is an enlarged side view of the groove according to FIG. 4; and

FIG. 5 is a plan view of two tension bars of a screen printing frame, arranged at an angle to each other, with representation of a tension strip.

DETAILED DESCRIPTION OF THE INVENTION

The groove hereafter described in the drawings is part of a silk screen printing frame as it is known for example from U.S. Pat. No. 3,908,293 or No. 3,601,912. The frame is a rectangular structure, in the outer peripheral frame portion of which the clamping groove described more specifically in the figures is disposed on every side. The tension bar 1 described below is, therefore, part of the frame.

As shown in FIG. 1, the C-shaped groove 2 in tension bar 1 has rear and front undercuts 11, 12. The arrows entered in the drawing are to represent the width of the undercuts.

Starting from a groove opening 10 of reduced width, groove 2 widens into a space of increased width, the groove depth being marked 15.

To tension the material 4 (silk screen printing fabric) first the clamping strip 3 is placed into the material 4 outside the groove 2, so that it has approximately the configuration shown in FIG. 1. Then the clamping strip 3 is introduced into the groove opening 10, for example in the manner shown in FIG. 3.1, and is brought to the position shown in FIG. 1. The slack position of the clamping strip 3 is illustrated by 3' in FIG. 1.

As soon as traction is exerted on the material 4 in pulling direction 5, the cross-section of the clamping strip 3' flattens, so that the clamping strip 3 assumes the form shown in solid lines in FIG. 1.

The groove opening 10 and the undercut 11 opposed to the pulling direction 5 are smaller in width than a material thickness 13 of material 4 plus the width 14 of the clamping strip 3.

The groove shown in FIG. 2 has an unsymmetrical form, the width of undercut 11 being smaller than the width of undercut 12.

In FIG. 3.1 it is shown that the clamping strip 3 is insertable through the groove opening 10 from above if groove 2 offers enough space for the inclined clamping strip 3 with two material thicknesses 13 of material 4 to find place in both cross-sectional dimensions of groove 2.

FIG. 3.2 shows that to improve the friction between clamping strip 3 and material 4 appropriate toothed edges 6 may be provided on the lateral edge of clamping strip 3 lying in front in pulling direction 5.

The embodiment according to FIG. 3.3 differs from that shown in FIG. 3.1 in that it is shown that, instead of a relatively great groove depth 15, as shown in FIG. 3.1, a smaller groove depth 15 may be chosen and the width of the undercut 12 lying in front in pulling direction 5 can be chosen greater.

In the embodiment according to FIG. 4 it is additionally shown that the undercut 12 lying in front in pulling direction 5 may have a pear-shaped enlargement, so that a better clamping of the clamping strip 3 in the region of the undercuts 11, 12 is ensured.

In reference to the embodiments according to FIGS. 3.1, 3.3 and 3.4 it is pointed out that these examples show only the introducing of the clamping strip 3 into the groove opening 10. To clamp the clamping strip 3 in the region of groove 2, the clamping strip 3 is then pushed down in such a way that also the edge lying in back in pulling direction 5 (which in the figures is shown set high) makes contact under the undercut 11.

FIGS. 4 and 4.1 shows that in the region of the undercut 12 lying in front in pulling direction 5, an additional catch 8 is disposed, into which the material 4 with the clamping strip 3 can snap, as is shown in FIG. 4 with reference to the clamping strip 3'.

FIG. 5 shows that in the case of two tension bars 1 perpendicular to each other, which are part of the screen printing frame, a tension strap 9 is used which is inserted into the end faces of the grooves 2 perpendicular to each other. In this manner the material 4 protruding from groove 2 is fixed with the tension strap 9.

I claim:

1. A clamping device for a printing frame for tensioning sheet type material, comprising a tension bar having a c-shaped longitudinal groove with front and rear undercuts; and a clamping strip consisting of resilient material and holding said sheet type material in said groove under unilateral tension, wherein said clamping strip is concave toward an opening of said groove and the width of the opening of said groove plus said rear undercut are less than the thickness of said sheet type material plus the width of the clamping strip.

2. A clamping device according to claim 1, wherein said clamping strip includes knurled or toothed edges.

3. A clamping device according to claim 1, wherein said clamping strip includes an adhesion-promoting surface.

4. A clamping device according to claim 1, wherein the undercuts are unsymmetrical and the width of the rear undercut is less than the width of the front undercut.

5. A clamping device according to claim 1, wherein the groove is sufficiently deep that two thicknesses of the sheet type material plus the width of the clamping strip can be inserted in the opening of the groove from above.

6. A clamping device according to claim 1, wherein the width of the clamping strip plus double the thickness of the sheet type material is less than the width of the rear undercut plus the opening of the groove plus the front undercut.

7. A clamping device according to claim 1, wherein the depth of the groove is sufficient to permit entry of the clamping strip and double the thickness of the sheet type material.

8. A clamping device for a printing frame for tensioning sheet type material, comprising a tension bar having a c-shaped longitudinal groove with front and rear undercuts, the front undercut having a catch; and a clamping strip holding said sheet type material in said groove under unilateral tension, wherein said clamping strip is concave toward an opening of said groove and the width of the opening of said groove plus said rear undercut are less than the thickness of said sheet type material plus the width of the clamping strip, and wherein the clamping strip snaps into said catch in said front undercut under tension with the sheet type material.

9. A clamping device for a printing frame for tensioning sheet type material, comprising a tension bar having a c-shaped longitudinal groove with front and rear undercuts; a clamping strip holding said sheet type material in said groove under unilateral tension, wherein said clamping strip is concave toward an opening of said groove and the width of the opening of said groove plus said rear undercut are less than the thickness of said sheet type material plus the width of the clamping strip; and, a tension strap fitted into a portion of said groove left free by said clamping strip and joining tension bars of adjacent clamping devices to retain diagonally free material.

* * * * *